United States Patent
Huang

(10) Patent No.: US 6,763,725 B1
(45) Date of Patent: Jul. 20, 2004

(54) PRESSURE READING STRUCTURE FOR PRESSURE GAUGE

(76) Inventor: Tien-Tsai Huang, No. 4-2, Lane 30, Wu Chuan St., Pan Chiao City, Taipei (TW)

(*) Notice: Subject to any disclaimer, the term of this patent is extended or adjusted under 35 U.S.C. 154(b) by 23 days.

(21) Appl. No.: 10/436,987

(22) Filed: May 14, 2003

(51) Int. Cl.[7] .................................................. G01L 7/00
(52) U.S. Cl. .............................. 73/756; 73/700; 73/706; 73/732
(58) Field of Search ................................... 73/700–756

(56) References Cited

U.S. PATENT DOCUMENTS

| | | | | |
|---|---|---|---|---|
| 3,992,945 A | * | 11/1976 | Judson | 73/734 |
| 4,161,123 A | * | 7/1979 | Carpenter | 73/741 |
| 4,196,634 A | * | 4/1980 | Hehl | 73/756 |
| 4,240,297 A | * | 12/1980 | Speidel | 73/711 |
| 4,269,058 A | * | 5/1981 | Richman | 73/1.68 |
| 4,638,666 A | * | 1/1987 | Wong et al. | 73/431 |
| 4,646,574 A | * | 3/1987 | Wahl et al. | 73/741 |
| 4,667,514 A | * | 5/1987 | Baer | 73/386 |
| 4,787,254 A | * | 11/1988 | Duckworth | 73/861.62 |
| 4,790,821 A | * | 12/1988 | Stines | 604/97.03 |
| 4,792,004 A | * | 12/1988 | Sheffield | 177/141 |
| 5,339,683 A | * | 8/1994 | Huang | 73/146.8 |
| 5,355,733 A | * | 10/1994 | Murphy et al. | 73/715 |

* cited by examiner

Primary Examiner—Edward Lefkowitz
Assistant Examiner—Jermaine Jenkins
(74) Attorney, Agent, or Firm—Bacon & Thomas, PLLC

(57) ABSTRACT

A pressure reading structure used in a pressure gauge is disclosed to include an index dial shaped like a circular cap and mounted in a hollow transparent cylindrical housing, and an angled pointer suspended over an angled top-view index dial portion and a side-view index dial portion of the index dial for enabling the user to view the readings of the pressure gauge from the top side as well as the peripheral side of the pressure gauge so as to enhance the convenience of using the gauge.

5 Claims, 4 Drawing Sheets

PRESSURE READING STRUCTURE FOR PRESSURE GAUGE

BACKGROUND OF THE INVENTION

1. Field of the Invention

The present invention relates to pressure gauges and, more specifically, to a pressure reading structure used in a pressure gauge for enabling the user to view the readings of the pressure gauge from different angles.

2. Description of Related Art

A pressure gauge is a pressure-measuring device for measuring the pressure of a gas or liquid. Pressure measuring devices for different purposes have different names. For example, a tire gauge is adapted to measure the air pressure of a tire; an extinguisher gauge is adapted to measure the internal pressure of a fire extinguisher. Further, regular pressure gauges include two types, i.e., one without liquid and the other with liquid (oil-filled). A pressure gauge with fluid is internally filled with an oil, for example, glycerin. The viscosity of the oil protects the internal component parts of the pressure gauge against vibrations.

Conventional pressure gauges commonly use a pointer and an index dial to show the measuring result. However, this pressure reading structure has a directional limitation. FIG. 1 illustrates a pressure gauge according to the prior art. The pressure reading structure of the pressure gauge comprises an index dial 91 and a pointer 92. During measuring, the user can only view the readings from the top side of the pressure gauge (the arrowhead direction). Due to this drawback, it is inconvenient to use a conventional pressure gauge in certain conditions. For example, when using a tire gauge to measure the pressure of the tires of a large vehicle, the user must change the posture of his/her body subject to the installation direction of the pressure gauge so that the readings of the tire gauge can be viewed. If the tire gauge is disposed underneath the vehicle, the user must crawl along the ground below the chassis of the vehicle in order to view the readings of the tire gauge.

Therefore, it is desirable to have a pressure gauge that eliminates the aforesaid drawbacks.

SUMMARY OF THE INVENTION

It is the main object of the present invention to provide a pressure reading structure for a pressure gauge, which enables the user to view the reading of the pressure gauge from different angles so as to enhance the convenience of using the gauge.

To achieve this and other objects of the present invention, the pressure reading structure is used in a pressure gauge comprising a hollow cylindrical housing and a pressure-measuring element. The housing is transparent. The pressure-measuring element is mounted inside the housing. The pressure reading structure comprises an index dial mounted inside the housing, and a pointer suspended inside the housing and coupled to the pressure-measuring element and adapted to be turned by the pressure-measuring element relative to the index dial upon filling of the pressure-measuring element with gas. The housing has a top-view zone and an annular side-view zone extended around the periphery of the top-view zone. The index dial is shaped like a circular cap having a top-view index dial portion corresponding to the top-view zone of the housing and a side-view index dial portion corresponding to the side-view zone of the housing. The pointer is an angled pointer having a top-view pointer portion suspended between the top-view zone of the housing and the top-view index dial portion of the index dial, and a side-view pointer portion suspended between the side-view zone of the housing and the side-view index dial portion of the index dial.

During a pressure measuring operation, the user can read the reading of the pressure gauge from above the gauge as well as from the peripheral side of the pressure gauge to enhance the convenience of using the gauge.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
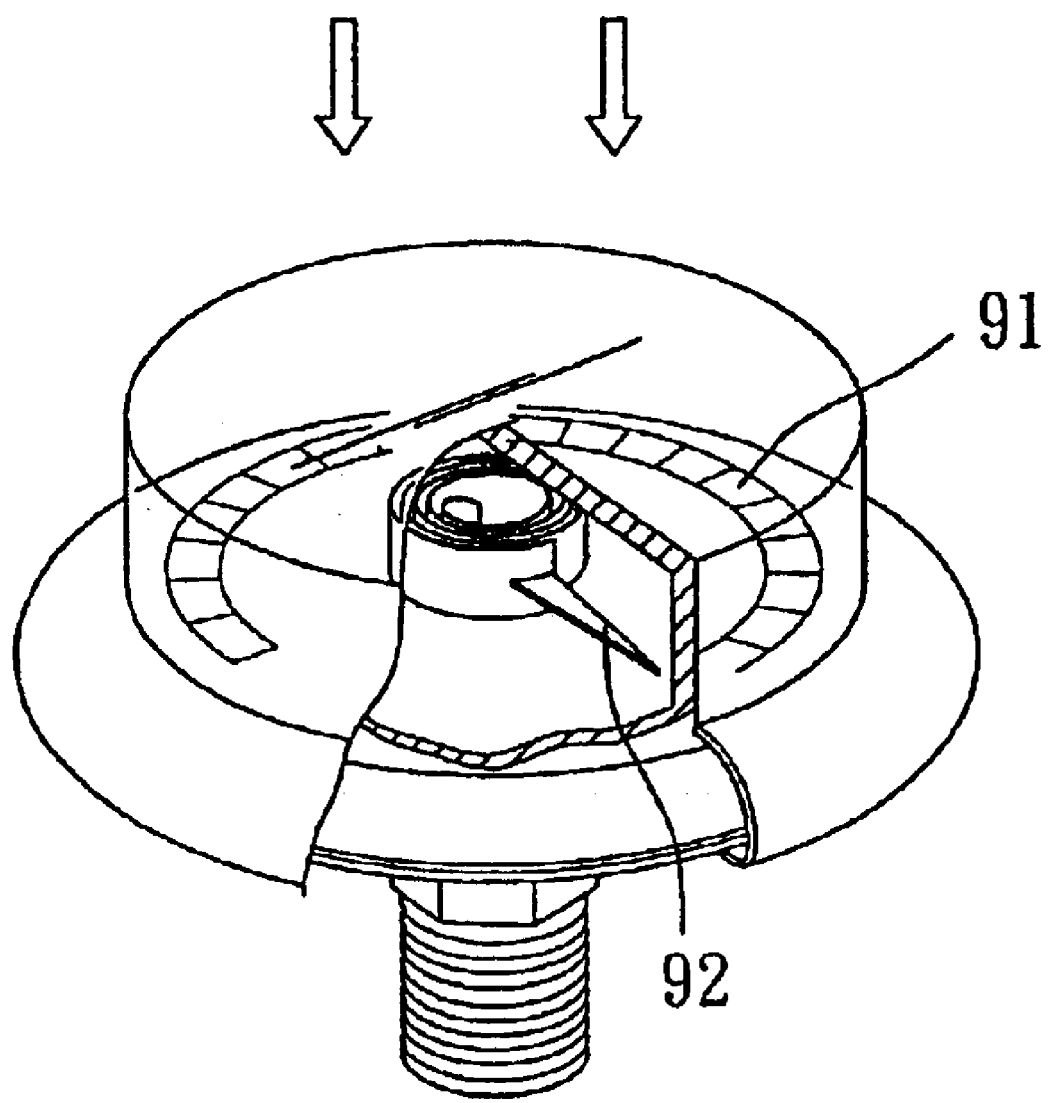
FIG. 1 is a cutaway view of a pressure gauge according to the prior art.
Figure 2:
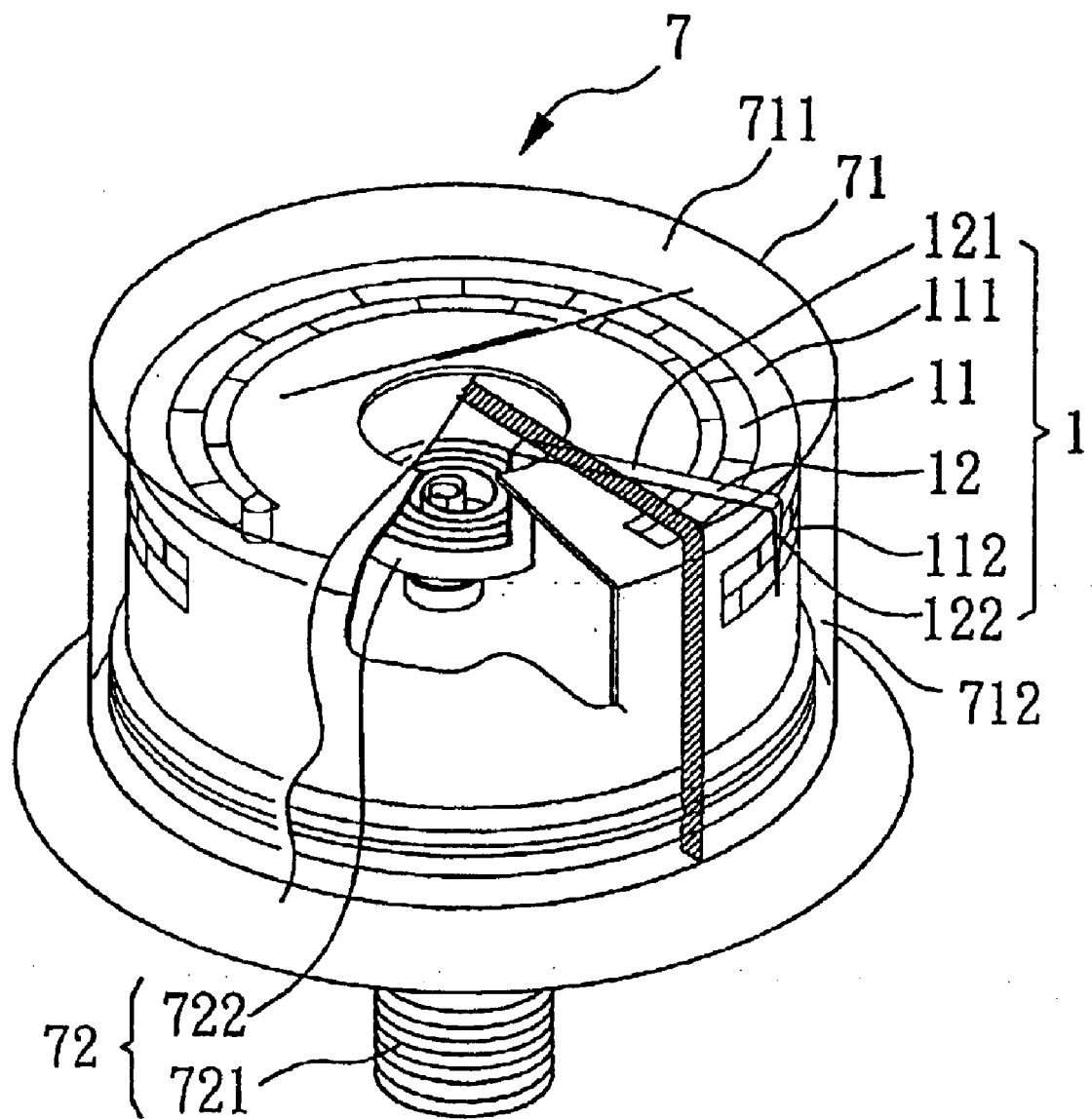
FIG. 2 is a cutaway view of a pressure gauge according to the present invention.

Referring to FIG. 2, a pressure gauge 7 in accordance with the first embodiment of the present invention is shown comprising a hollow transparent cylindrical housing 71 and a pressure-measuring element 72 mounted inside the housing 71. According to the present invention, the housing 71 is molded from transparent material, for example, acrylic. The pressure reading structure, referenced by 1, of the present invention is installed in the pressure gauge 7, and comprises an index dial 11 and a pointer 12. Both the index dial 11 and the pointer 12 are mounted inside the housing 71. The pointer 12 is at one end connected to the pressure-measuring element 72. The pressure-measuring element 72 comprises an intake pipe 721 and a pressure-measuring copper element 722. The intake pipe 721 extends to the outside of the housing 71. The pressure-measuring copper element 722 is a hollow flat coil member having a substantially annular inner section connected to the intake pipe 721 and a substantially annular outer section connected to the pointer 12.

Referring to FIG. 2 again, the housing 71 has a top-view zone 711 and an annular side-view zone 712 extended around the periphery of the top-view zone 711. The index dial 11 is shaped like a circular cap having a top-view index dial portion 111 corresponding to the top-view zone 711 of the housing 71, and a side-view index dial portion 112 corresponding to the side-view zone 712 of the housing 71. The pointer 12 has a top-view pointer portion 121 suspended between the top-view zone 711 of the housing 71 and the top-view index dial portion 111 of the index dial 11, and a side-view pointer portion 122 integrally formed perpendicular to the top-view pointer portion 121 and suspended between the side-view zone 712 of the housing 71 and the side-view index dial portion 112 of the index dial 11.

When reading the indication of the pressure gauge 7, the user can view the position of the pointer 12 relative to the index dial 11 from the top side as well as the peripheral side so as to enhance the convenience of using the gauge, i.e., the user can obtain the reading of the pressure gauge 7 by viewing the position of the top-view pointer portion 121 relative to the top-view index dial portion 111 of the index dial 11, or the position of the side-view pointer portion 122 relative to the side-view index dial portion 112 of the index dial 11.

Figure 3:
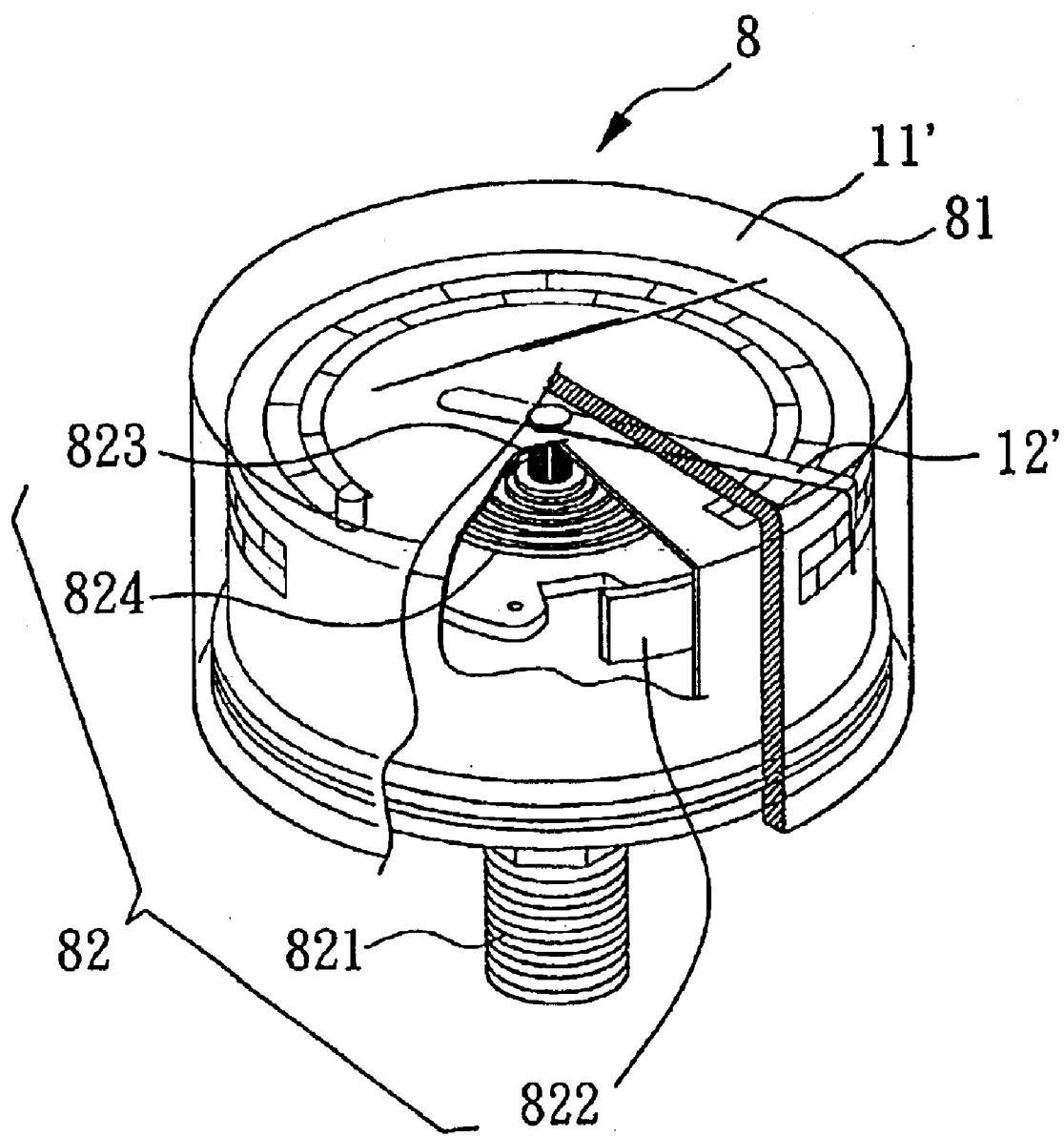
FIG. 3 is a cutaway view of an alternative form of the pressure gauge according to the present invention.

FIG. 3 shows a pressure gauge 8 constructed according to the second embodiment of the present invention. This embodiment is similar to the aforesaid first embodiment (see FIG. 2), with the exception that the pressure gauge 7 of the aforesaid first embodiment is a liquid-free pressure gauge. That is to say, the pressure gauge 8 of the second embodiment is internally filled with an oil (not shown). The pressure-measuring element 82 of the pressure gauge 8 comprises an intake pipe 821 extended out of the housing 81, a pressure-measuring copper element 822 which is a Bourdon tube arranged in a semi-circular profile, a gear set 823, and a hair spring 824 coaxially installed with the gear set 823. The pressure-measuring copper element 822 is at one end connected to the intake pipe 821, and at the other end coupled to the gear set 823. The pointer, referenced by 12' is an angled pointer secured on the output shaft (not shown) of the gear set 823. As illustrated in FIG. 3, the index dial, referenced by 11' is similar to that of the aforesaid first embodiment and is shaped like a circular cap, and that the pointer 12' has a first portion and a second portion perpendicular to the first portion. Therefore, this second embodiment achieves the same effects as the aforesaid first embodiment does.

Figure 4:
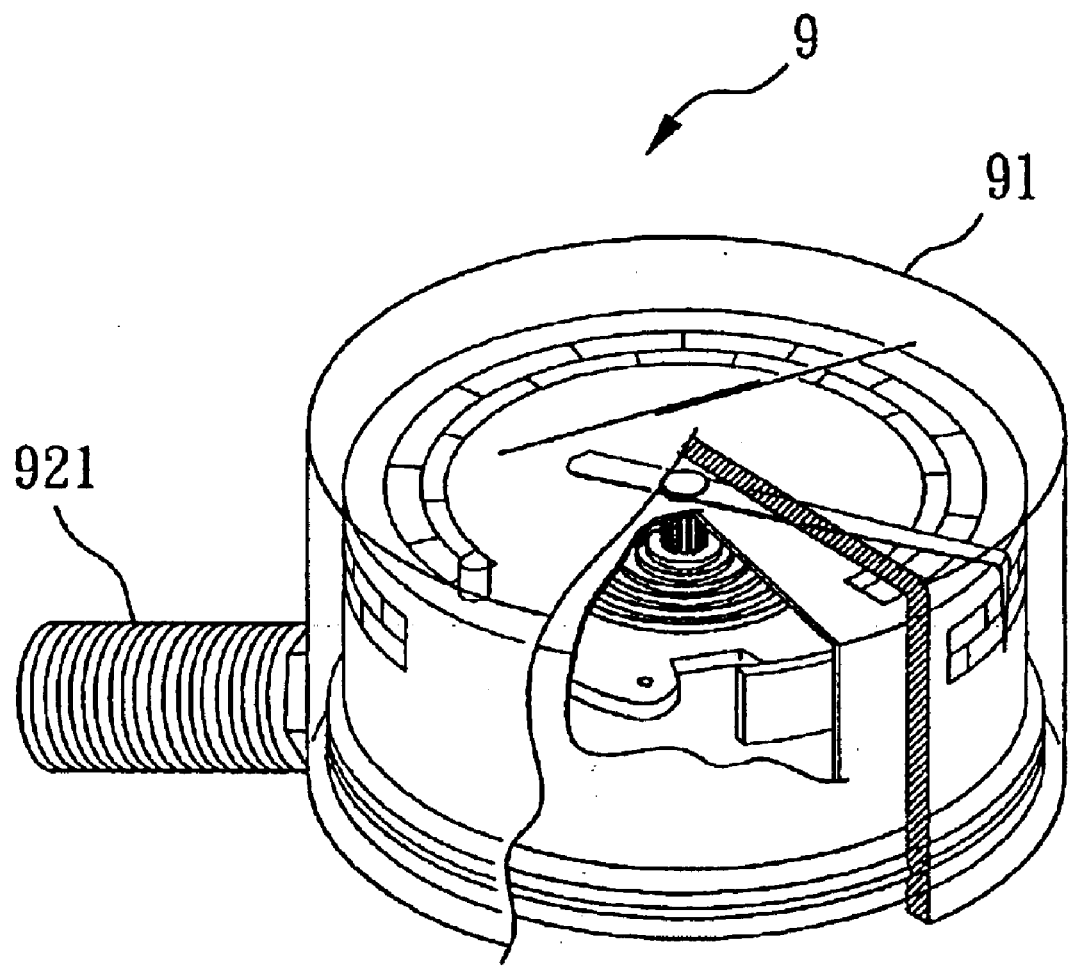
FIG. 4 is a cutaway view of another alternative form of the pressure gauge according to the present invention.

The pressure gauges 7 and 8 indicated in FIGS. 2 and 3 are adapted to measure the air pressure of a device. However, the invention can also be employed to any of a variety of gauges including fire-fighting gauges. As illustrated in FIG. 4, an intake pipe 921 is provided at one side of the housing 91 of the pressure gauge 9. The pressure gauge 9 of this type can also achieve the object of enhancing the convenience of use by allowing the pressure gauge to be read from above as well as from the peripheral side of the pressure gauge.

It is to be appreciated that the top-view portion of the pointer 12 need not be only perpendicular to the side-view portion, and may alternatively be oblique. Although the present invention has been explained in relation to its preferred embodiments, it is to be understood that many other possible modifications and variations can be made without departing from the scope of the invention as hereinafter claimed.

What is claimed is:

1. A pressure reading structure used in a pressure gauge comprising a hollow cylindrical housing and a pressure-measuring element mounted inside said housing, the pressure reading structure comprising an index dial mounted inside said housing and a pointer suspended inside said housing and coupled to said pressure-measuring element and adapted to be turned by said pressure-measuring element relative to said index dial upon filling of a flow of gas into said pressure-measuring element, wherein:

said housing is transparent and has a top-view zone and an annular side-view zone extended around the periphery of said top-view zone; said index dial is shaped like a circular cap having a top-view index dial portion corresponding to said top-view zone of said housing and a side-view index dial portion corresponding to said side-view zone of said housing; said pointer is an angled pointer having a top-view pointer portion suspended between said top-view zone of said housing and said top-view index dial portion of said index dial and a side-view pointer portion suspended between said side-view zone of said housing and said side-view index dial portion of said index dial.

2. The pressure reading structure as claimed in claim 1, wherein said pressure-measuring element of said pressure gauge comprises an intake pipe extended out of said housing and a pressure-measuring copper element, said pressure-measuring copper element being a hollow flat coil member having a substantially annular inner section connected to said intake pipe and a substantially annular outer section connected to said pointer.

3. The pressure reading structure as claimed in claim 1, wherein said pressure-measuring element comprises an intake pipe extended out of said housing, a gear set, a hair spring coaxially installed with said gear set, and a pressure-measuring copper element, said pressure-measuring copper element being at one end connected to said intake pipe and at an opposite end coupled to said gear set; said pointer being secured to an output shaft of said gear set.

4. The pressure reading structure as claimed in claim 1, wherein said top-view pointer is integrally formed perpendicular to said side-view pointer.

5. The pressure reading structure as claimed in claim 1, wherein said top-view pointer is integrally formed oblique to said side-view pointer.

* * * * *